United States Patent Office 3,493,280
Patented Feb. 3, 1970

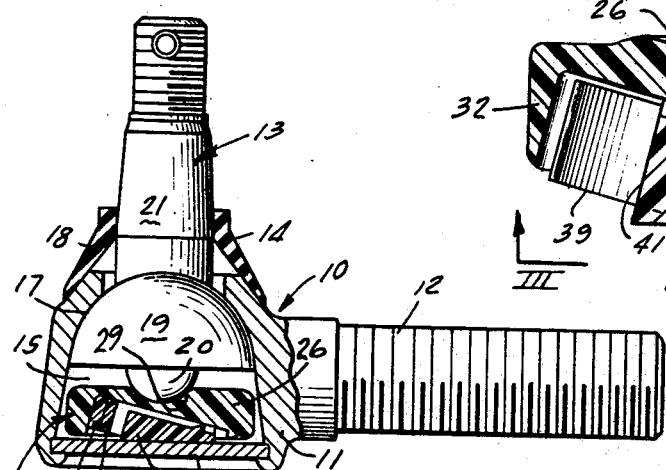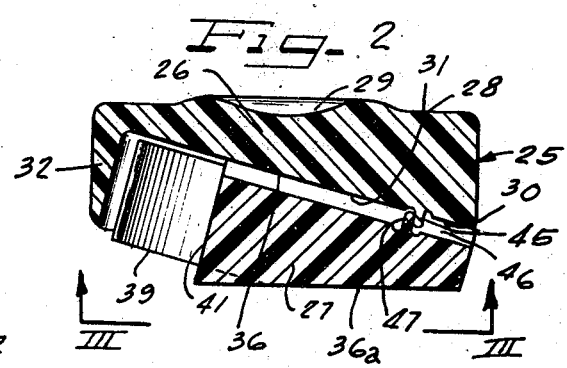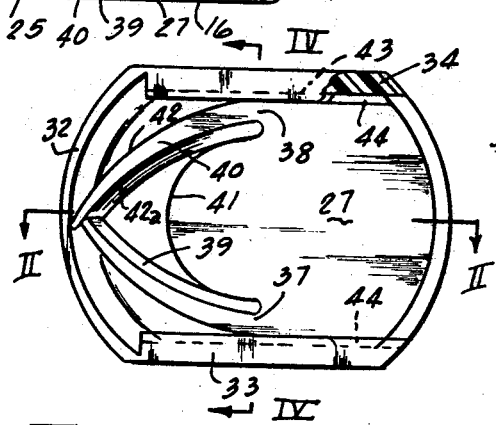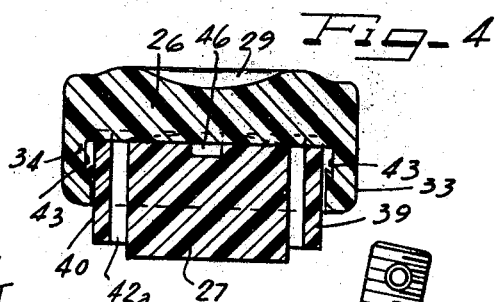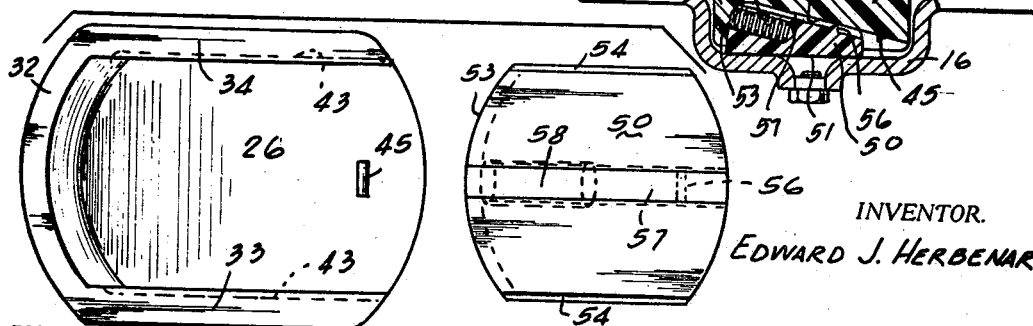
INVENTOR.
EDWARD J. HERBENAR
ATTORNEYS

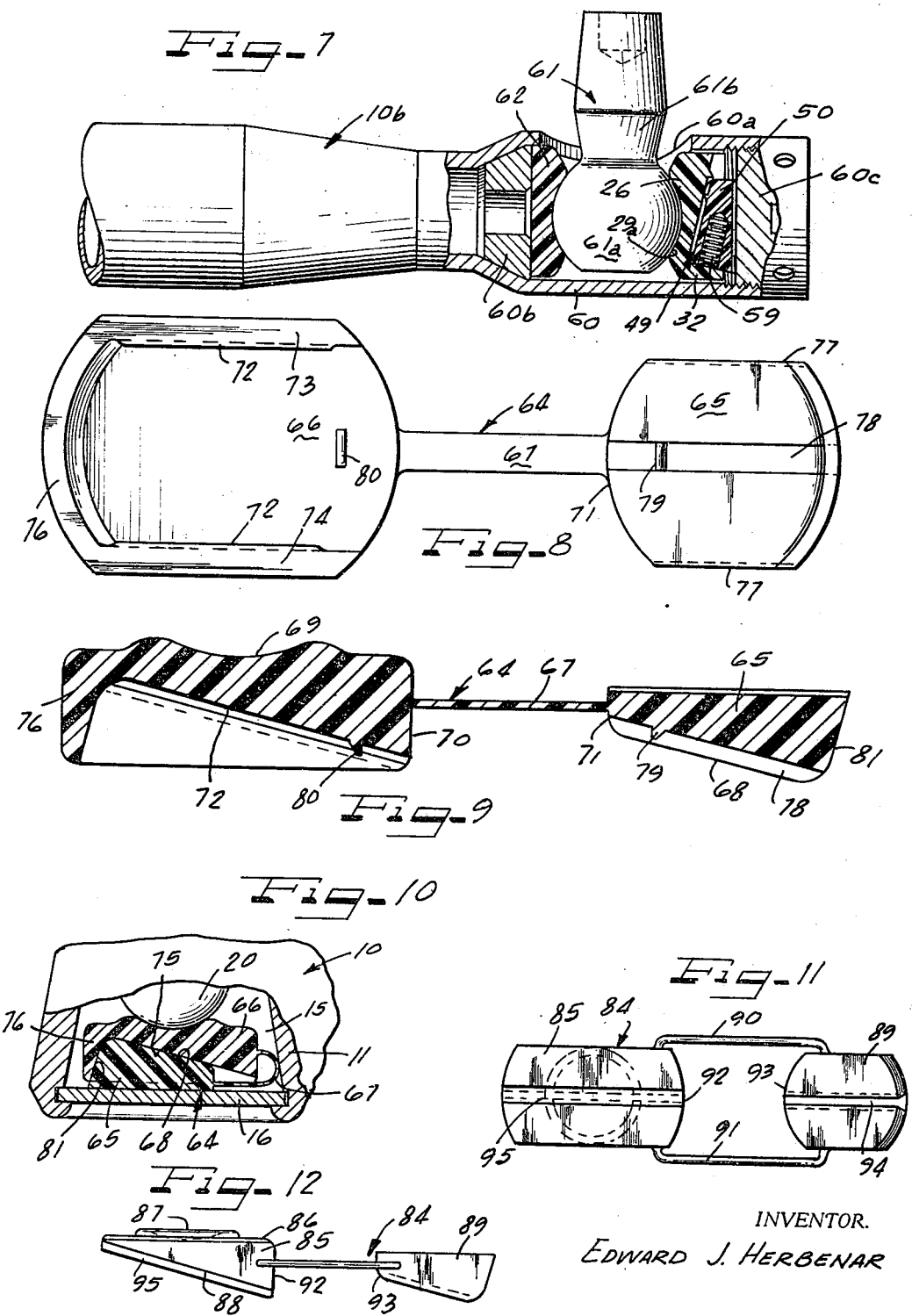

3,493,280
WEAR COMPENSATING WEDGE FOR PIVOT JOINTS
Edward J. Herbenar, Detroit, Mich., assignor to TRW Inc., Cleveland, Ohio, a corporation of Ohio
Filed Mar. 23, 1967, Ser. No. 625,548
Int. Cl. F16c 33/00, 25/00, 11/06
U.S. Cl. 308—244       6 Claims

ABSTRACT OF THE DISCLOSURE

A wear-compensating wedge unit preferably of molded plastic for use in ball joints which has a first portion having one face concave for seating the movable ball and second face converse the first face and inclined relative to it, a second portion formed as a wedge mating with the inclined face, and a spring acting on the wedge and the first portion to shift the wedge with respect to the first portion so as to increase the height of the unit to compensate for wear of the unit and the other parts of the joint.

BACKGROUND OF THE INVENTION

Field of the invention

This invention relates to pivot joints or socket assemblies and more specifically to a wear compensating wedge unit for use in ball joints. The wedge unit of this invention is dimensioned to fit between the movable ball of the joint and the joint housing and has two major members or portions, one of which has a contoured face for seating the ball, and the other of which is wedge-shaped. Spring means, preferably part of one or both portions, act on the two portions to move the wedge portion with respect to the other portion, thereby increasing the height of the unit. The increase in height of the unit compensates for wear encountered in the use of the pivot joint.

Prior art

Wear compensating devices to prevent looseness in pivot joints are known to the art. However, those prior art devices which may have operated on a wedge principle utilized wedge units which were independent from the ball seating bearing, thereby increasing the number of components in the joint with a resultant increase in cost and in difficulty of assembly. Further, in such prior art devices, the force which would result in an adjustment of the height of the wedge unit is supplied from some source external to the unit rather than from an internal spring means. This further increases cost and difficulty of construction.

SUMMARY

This invention pertains to a wear compensating wedge unit which effectively takes up looseness caused by wearing of the components in a pivot joint. The wear compensating unit consists of a bearing member and a wedge member with a spring means acting between the two. The bearing member has a concave portion on one face providing a seat for the ball of the joint. The converse face of the bearing member is inclined and has a curved back wall and straight side walls. The bottoms of the back wall and side walls are parallel to the top face with the central portion of the bottom face inclined with respect to them.

The wedge member has a flat bottom face and an inclined top face. The wedge member is dimensioned to fit within the back and side walls of the bearing member. The inclined faces of the bearing member and the wedge are identically sloped so that when the wedge member is positioned within the back and side walls of the bearing member and the two inclined faces are in contact, the unit has a determined free state height.

The height of the unit is variable by changing the placement of the wedge member with respect to the bearing member. When the wedge member is closest to the back wall of the bearing member, the unit is at its minimal height. As the wedge slides with respect to the inclined face of the bearing member further away from the back wall the height of the unit is increased.

Spring means acting on the back wall of the bearing member and on the wedge member are utilized to force the wedge member away from the back wall of the bearing member without unseating the two wedge portions. Therefore, it can be seen that after installation of the wear compensating unit in a pivot joint, the joint parts are urged into bearing relation regardless of variations in this stacking height, and as this height varies, due to wear of the joint parts, the spring means force the wedge member away from the back wall of the bearing member, thereby increasing the height of the unit to take-up any looseness.

The wedge unit is preferably composed of molded plastic such as nylon, Teflon, polyethylene or the like self-lubricating material, but can also be made of other material such as metal. Since one portion of the unit actually forms a bearing, the material for this portion should have bearing qualities.

A feature of a preferred embodiment of the invention is the provision of spring means which are part of the unit, being a molded portion of one or both portions of the unit.

It is, therefore, an object of this invention to provide a wear compensating wedge unit providing a bearing for a pivotal joint.

It is a further object of this invention to provide a molded plastic wedge unit to take-up looseness in pivot joints.

It is a further object of the invention to provide a wear compensating wedge unit for ball joints with an integral ball seat bearing surface and spring means acting to increase the height of the unit to take-up looseness in the joint.

It is yet another object of this invention to provide a wear compensating molded plastic wedge unit with an internal molded spring means and an integral ball seat bearing to take-up looseness in pivotal joints.

It is a further and more specific object of this invention to provide an integral ball seat bearing and wear compensating wedge unit having internal spring means to take-up looseness in pivotal joints.

BRIEF DESCRIPTION OF THE DRAWINGS

FIGURE 1 is a side elevational view with parts in vertical cross-section of a ball and socket type pivot joint containing a wear compensating wedge unit embodying the principles of the present invention;

FIGURE 2 is an enlarged vertical cross-sectional view of the wear compensating wedge unit shown in FIGURE 1;

FIGURE 3 is a bottom plan view of the wear compensating wedge unit of FIGURE 2;

FIGURE 4 is a transverse cross-sectional view of the wear compensating wedge unit taken along the lines IV—IV of FIGURE 3;

FIGURE 5 is an elevational view of a pivotal joint with parts in cross-section, including a second embodiment of a wear compensating wedge unit of the invention;

FIGURE 6 is a bottom plan view of the bearing and wedge member of the wear compensating wedge unit of FIGURE 5;

FIGURE 7 is a side elevational view of a different type of pivotal joint with portions thereof broken away and in cross-section to show underlying portions, including a wedge unit like that shown in FIGURE 5;

FIGURE 8 is a bottom plan view of a third embodiment of the wear compensating wedge unit of this invention;

FIGURE 9 is a longitudinal cross-sectional view of the wear compensating wedge unit of FIGURE 8;

FIGURE 10 is a fragmentary broken view of a pivot joint equipped with the wear compensating wedge unit of FIGURE 8 shown in cross-section;

FIGURE 11 is a bottom plan view of a fourth embodiment of the wear compensating wedge unit of this invention; and FIGURE 12 is a side view of the wear compensating wedge unit of FIGURE 11.

DESCRIPTION OF THE PREFERRED EMBODIMENTS

In FIGURE 1, a ball and socket joint 10, such as is used in tie rod ends for automotive steering linkages, is shown as including a housing 11 with a laterally extending stem 12 adapted to be threaded into a tie rod end, a stud 13 adapted to be connected to the eye end of a link rod (not shown) and a dust cap or boot 14 sealing the housing. The housing 11 has an open ended bore 15 therethrough with a large open end closed by a plate or disk 16 spun or peened therein and a fragmental spherical bearing wall 17 converging to a smaller open end 18. The stud 13 has a fragmental spherical head 19 in the housing, tiltable and rotatable on the bearing wall 17, a smaller semi-ball end portion 20 projecting from the central portion of the bottom of the head and a shank 21 projecting freely through the small open end 18.

To prevent looseness between the housing 11 and stud 13, regardless of variations in stacking heights of the assembly and wear developed during use of the joint 10, there is positioned in the housing 11 between the plate 16 and ball end 20, a compensating wedge unit 25 of this invention.

As shown in FIGURES 1 and 2, the wedge unit 25 consists of a bearing member 26 and a wedge member 27, preferably formed of molded plastic. The bearing member 26 has a top face 28 with a central concave portion 29. The hemispherical ball end 20 of the stud 13 seats in this concave portion 29 of the bearing 26.

The converse face 30 of the bearing member 26 has an inclined central area or recess 31 bounded by a curved back wall 32 and side walls 33 and 34. The bottoms of the walls 32, 33 and 34 are parallel with the plane of the face 28 of the bearing member.

The wedge member 27 has a top face 36 which is inclined with respect to the bottom face 36a at the same angle which the portion 31 of the bearing 26 is inclined with respect to the top face 28 of the bearing 26.

As shown in FIGURE 3, the wedge member 27 has two shoulder portions 37 and 38 out of which extend two integral flexible curved arms 39 and 40. The two arms 39 and 40 extend alongside and beyond a rounded front 41 of the wedge member 27. The arm 39 is shorter than the arm 40 and has a smaller radius. In their unloaded state, the arm 39 terminates radially inward from the arm 40. The arms 39 and 40 extend out from the main body portion of the wedge unit 27 at the same angle as the inclined face 36. The wedge member 27 is dimensioned to fit between the side walls 33 and 34 of the bearing member with the inclined face 36 engaging the inclined face 31 of the bearing member. When the unit is thus assembled, the outside face 42 of the arm 40 will engage and ride on the back wall 32 of the bearing member 26.

As the main body portion of the wedge member 27 is moved closer to the back wall 32 of the bearing member, the arms 39 and 40 will be radially compressed with the arm 39 sliding radially inward against the inner face 42a of the arm 40 and the outer face 42 of the arm 40 sliding against the inner face of the arcuate back wall 32.

Because of the resilient nature of the arms 39 and 40, they will resiliently resist radial compression, thereby acting as cantilever springs.

In order to retain the wedge member 27 in operating position with the bearing member 26, dovetail grooves 43 are provided in the side walls 33 and 34 and tongues 44 are provided on the sides of the wedge member 27 for engagement in the dovetail grooves 43. In order to prevent the wedge member 27 from sliding out of open ends of the bearing member dovetail grooves 43, a groove 46 is formed down the center of the inclined face 36 of the wedge member 27 and a raised projection 45 depends from the inclined face 31 of the bearing member and fits in the groove 46 when the two members are assembled. A second raised projection 47 is formed in the groove 46 of the wedge member. When the wedge member and bearing member are assembled, the wedge member will be able to slide with respect to the bearing member until the two raised projections 45 and 47 contact each other. The raised projections thereby provide a one-way slide catch preventing the wedge from sliding out of the bearing dovetail grooves 43. It is, of course, to be understood that other means of preventing the wedge member from sliding out of the bearing member can be provided.

It can thus be seen that the height of the unit is smallest when the wedge member is closest the arcuate back wall 32 of the bearing member and that as the wedge member slides away from the back wall 32, the height of the unit increases.

During assembly of the pivot joint 10, the wear compensating wedge unit 25 is installed in the housing 11 of the pivot joint 10 in its compressed or loaded state with the wedge member 27 relatively closely spaced from the back wall 32 and the cantilever spring arms 39 and 40 in a compressed state. Thereafter, as use of the pivot joint creates wear erosion of the parts thereof, the cantilever spring arms 39 and 40 will force the wedge member 27 to slide in the dovetail grooves 43 away from the back wall 32 of the bearing member 26, thereby increasing the height of the unit to take-up any looseness in the pivot joint created by the wear erosion.

In the embodiment shown in FIGURES 5 and 6, a joint 10a especially adapted for automotive wheel suspensions, but with parts generally similar to the joint 10 of FIGURE 1 and identified with the same reference numerals, is provided, with a modified wedge unit 49 having the same bearing member 26 as the wear compensating wedge unit 25, but a modified wedge member 50. As shown in FIGURE 5, the closure 16 for the housing 11 is cupped to provide a well receiving the unit 49.

The member 50 has a flat bottom face 51, an inclined top face 52 substantially the same as faces 36 and 36a of the first embodiment, and an arcuate front wall 53 dimensioned to mate with the arcuate back wall 32 of the bearing member 26. Tongues 54 extending from the sides of the wedge member 26 fit in the dovetail grooves 43 in the side walls 33 and 34 of the bearing member and a projection 56 in a groove 57 which extends down the center of the inclined face 52 of the wedge unit 26 mates with the projection 45 in the bearing member to prevent the wedge unit from sliding out of the bearing member.

A bore 58 extends into the wedge member 50 from the front wall 53 thereof. A coil spring 59 having an unloaded length greater than the depth of the bore 58 is placed within the bore 58. Thereafter, when the wedge member 50 is assembled with the bearing member 26, the coil spring 59 will bear against the inside face of the arcuate back wall 32 of the bearing member and will supply spring force tending to push the wedge member away from the back wall of the bearing member. In this embodiment, the coil spring 59 acts on the unit in the same manner as the cantilever leaf springs 39 and 40 of the embodiment shown in FIGURE 3, and as the wedge member 50 is forced away from the back wall of the bearing member, the height of the assembled unit will increase, thereby allowing it to compensate for any looseness in the pivot joint.

FIGURE 7 shows the wear compensating wedge unit of FIGURES 5 and 6 as embodied in a tubular drag link or tie rod 10b where the housing is a cylindrical end portion 60 of the rod having a keyhole or elongated slot 60a in the side wall, a plug 60b pressed into a neck portion of the rod end and a closure plug 60c threaded into the rod end. The stud 61 has a full ball end 61a in the housing seated on side bearing seats including a seat disk 62 bottomed on the plug 60b and the bearing 26 of a wedge unit 49 which is the same as shown in FIGURES 5 and 6 except that the bearing recess 29a is larger than the recess 29 to encompass more of the ball end 61a. In this embodiment, the bearing member 26 of the unit 49 engages the ball 61a of the stud 61 of the joint on the side thereof rather than on the bottom as in previous illustrations. In this embodiment, the unit 49 reacts against the screw plug 60c on which the wedge member 50 is seated to load the ball 61a of the stud into seating engagement with the seat disk 62 on the other side of the ball 61a from the unit 49. In such embodiment, the joint would be assembled with the plug 60c exerting a full seating load on the wedge 50, and thereafter, as wear erosion develops, the coil spring 59 will force the wedge member 50 away from the back wall 32 of the bearing member to increase the height of the wear compensating wedge unit 49. This increase in height will take-up any looseness which would otherwise be caused by wear erosion, and the ball 61a will continue to be in loaded seating contact with the seat disk 62 and the bearing member 26.

In the embodiment shown in FIGURES 8 to 10, the unit 64 is in one piece with the wedge member 65 formed integrally with the bearing member 66 through a relatively narrow resilient strap 67. The wedge member 65 is formed with its inclined face 68 on one side of the strap 67 while the bearing member 66 is formed with its concave ball seating face 69 on the other side of the strap 67. The strap 67 is formed integral with the front side 70 of the bearing member 66 intermediate the top and bottom thereof and spaced from the sides thereof. The other end of the strap 67 is formed integral with the low end 71 of the wedge member 65 intermediate the top and bottom thereof and spaced from the sides thereof.

Dovetail grooves 72 are formed in the side walls 73 and 74 of the bearing member 66 near the inclined surface 75 extending from the front 70 of the bearing member 66 to the back wall 76. Flanges or tongues 77 on the sides of the wedge member 65 extend into the dovetail grooves 72 when the unit is in its assembled position. A groove or channel 78 is cut into the center of the inclined surface of the wedge from the front to the back thereof. A raised projection 79 is formed in the groove 78 near the low end 71 of the wedge member 65. A similar raised projection 80 is formed on the inclined surface 75 of the bearing member 66 near the front 70. The raised projection 80 is located in the central portion of the inclined surface 75 and when the unit is assembled, the raised projection 80 will seat in the groove 78 of the wedge member.

As shown in FIGURE 10, the wear compensating wedge unit 64 is assembled between the ball end 20 and closure 16 in the bore 15 of the joint 10 as described in FIGURE 1 by bending the strap 67 into a substantially U-shaped position and bringing the inclined face 68 of the wedge member 65 into engagement with the inclined face 75 of the bearing member 66 so that the bearing member 66 is seated on top of the wedge member 65. The unit is initially assembled with the high end 81 of the wedge member in contact with the backwall 76 of the bearing member, thereby positioning the unit at its lowest height. Due to the resiliency of the strap 67, it acts as an actuating spring, pulling the wedge member 65 away from the back wall 76 of the bearing member. As the wedge member moves away from the back wall 76 of the bearing member, the height of the assembled unit is increased. This increase in height can continue until the raised projection 80 on the inclined surface 75 of the bearing member 66 contacts the raised projection 79 in the groove 78 of the wedge member 65. In this manner, the assembled unit can take-up any looseness which may develop due to wear erosion in the pivotal joint 10.

In the embodiment shown in FIGURES 11 and 12, the wedge unit 84 has a bearing member 85 with a flat face 86 containing a concave portion 87 for seating the ball of the pivotal joint. The opposite face 88 of the member 85 is inclined. In this embodiment, there are no side or back walls on the bearing member as exist in previously described embodiments. The wedge member 89 is substantially the same as the previously described wedge members. The bearing member 85 is integrally connected with the wedge member 89 by two resilient side legs 90 and 91 which are a molded part of the unit 84. These side legs 90 and 91 form springs and have one of their ends anchored to the bearing member 85 near its high front end 92 while their other ends are anchored to the wedge member 89 at its sides near its low end 93. A dovetail groove 94 is formed in the center of the wedge member 89 from the front to the back thereof and is cut into its inclined face. A mating dovetail tongue 95 is formed down the middle of the inclined surface of the bearing member 85 from the front to the back thereof. When the resilient springs 90 and 91 are bent so as to bring the inclined face of the wedge member into engagement with the inclined face of the bearing member, the dovetail tongue 95 of the bearing member may be slid into the dovetail groove 94 of the wedge member, thus holding the inclined surfaces of the two members in contact.

The resilient nature of the side springs 90 and 91 when the unit is assembled will exert a spring force on the wedge member 89 to pull it toward the high end 92 of the bearing member 85. As the wedge member 89 is pulled toward the high end 92 of the bearing member 85, the height of the assembled unit will increase. In this way, the embodiment shown in FIGURES 11 and 12 can effectively take-up looseness in a pivotable joint the same as the other embodiments.

From the above description, it will be understood that my invention provides for a wear compensating wedge unit for use within the housing of a pivotal joint. The unit in its preferred embodiment consists of a bearing member for seating the ball of the movable stud and a wedge and spring member cooperating with the bearing member to take-up any looseness caused by wear erosion of the component parts of the pivotal joint assembly. Other embodiments provide for wear compensating wedge units which have different spring means, either integral with the bearing and wedge members or separate but internal to the assembled unit. All of the embodiments have an integral contoured surface which provides a bearing seat for the ball of a movable stud.

Although minor modifications might be suggested by those versed in the art, it should be understood that I wish to embody within the scope of the patent granted hereon, all such modifications as reasonably and properly come within the scope of my contribution to the art.

I claim as my invention:

1. A wear compensating wedge unit for use in pivot joints having movable studs, which comprises: a bearing member having a contoured first surface adapted to seat the movable stud and an inclined surface converse the first surface, side and back walls adjacent the said inclined surface, a wedge member having a surface mutually inclined with said inclined surface of said bearing member and dimensioned to mate with said inclined surface of said bearing member between said back wall and side walls, a front surface on said wedge member, and spring means associated with said wedge member acting against said back wall to resiliently bias said wedge member away from said back wall.

2. The unit of claim 1 wherein the spring means are two overlapped resilient arms projecting from said wedge member.

3. A wear compensating self-lubricating molded plastic wedge unit for ball stud joints adapted to be positioned in the joint housing between the ball end of the stud and the closure for the housing to tighten the stud in the housing, which comprises: a pair of mated plastic blocks one of which is contoured to embrace the ball end and the other of which bottoms on the closure of the housing, said blocks having inclined mating surfaces effective to vary the combined height of the blocks, spring means urging the blocks in opposite directions to increase said combined height, said spring means formed as a monolithic, unitary part of at least one of said plastic blocks.

4. The unit of claim 3 wherein the spring means is a flexible resilient strap connecting the blocks.

5. A wear compensating wedge unit for use in ball stud pivot joints, which comprises: a bearing member having a first surface contoured to provide a seat for the ball of the stud of the pivot joint and a second surface converse the first surface and inclined with respect to said first surface, a wedge member having an inclined surface with the same slope as said second surface of the said bearing member, said bearing member and said wedge member adapted to slidingly mate along said inclined surfaces, spring means acting on said bearing member and said wedge member to slide said wedge member with respect to said bearing member to increase the height of the mated wedge and bearing member unit, said spring means formed as a monolithic, unitary part of at least one of said members, and said spring means consisting of resilient arms projecting from the wedge member acting as cantilever springs when loaded against said bearing member.

6. A wear compensating unit for use in joints having movable studs, which comprises: a first plastic member having a first surface providing a bearing surface for seating the movable stud and a second surface opposite the first surface and inclined with respect to the first surface, a second plastic member having a bottom and an inclined top surface mating with said second surface of said first member, plastic spring means acting on said first and second members to change the position of said second member relative to said first member to increase the height of the combination of said first and said second members, and said spring means formed as a monolithic part of at least one of said members.

References Cited

UNITED STATES PATENTS

| 1,848,471 | 3/1932 | Gebert et al. | 287—90 |
| 2,924,431 | 2/1960 | Chadbourne | 254—192 |
| 3,384,398 | 5/1968 | Wehner | 287—90 |

FOREIGN PATENTS

| 661,686 | 11/1951 | Great Britain. |
| 18 | 1/1931 | Australia. |

CARROLL B. DORITY, JR., Primary Examiner

U.S. Cl. X.R.

287—90; 308—66